(12) United States Patent
Ashby et al.

(10) Patent No.: US 6,564,109 B1
(45) Date of Patent: May 13, 2003

(54) METHODS AND SYSTEMS FOR COMPENSATION OF MEASUREMENT ERROR

(75) Inventors: Malcolm J. Ashby, Hamilton, OH (US); Sridhar Adibhatla, West Chester, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/449,771

(22) Filed: Nov. 26, 1999

(51) Int. Cl.$^7$ .............................................. G05B 13/02
(52) U.S. Cl. ............................ 700/32; 700/50; 700/54; 700/71; 700/304; 701/34; 701/110; 702/96; 702/104
(58) Field of Search .......................... 700/32–34, 54, 700/299, 304, 301, 290, 28, 44–45, 47, 50, 71–72; 702/91, 96, 104; 701/34, 110

(56) References Cited

U.S. PATENT DOCUMENTS

| | | | |
|---|---|---|---|
| 4,054,780 A | * 10/1977 | Bartley et al. | 700/30 |
| 4,180,858 A | * 12/1979 | Gaines et al. | 700/268 |
| 4,215,412 A |   7/1980 | Bernier et al. | 701/112 |
| 4,423,594 A |   1/1984 | Ellis | 60/39.28 |
| 4,502,109 A | *  2/1985 | Delmege et al. | 700/69 |
| 4,811,808 A | *  3/1989 | Matsumoto et al. | 180/197 |
| 4,922,428 A | *  5/1990 | Takahashi | 701/94 |
| 4,958,269 A | *  9/1990 | Gritter | 700/33 |
| 5,080,496 A |   1/1992 | Keim et al. | 374/144 |
| 5,105,372 A | *  4/1992 | Provost et al. | 702/185 |
| 5,323,667 A | *  6/1994 | Tweed et al. | 477/107 |
| 5,377,536 A |   1/1995 | Angermaier et al. | 73/116 |
| 5,394,331 A | *  2/1995 | Dudek et al. | 701/106 |
| 5,489,829 A |   2/1996 | Umida | 318/561 |
| 5,506,778 A |   4/1996 | Matsumoto et al. | 701/111 |
| 5,508,923 A | *  4/1996 | Ibamoto et al. | 701/70 |
| 5,583,766 A | * 12/1996 | Birchenough et al. | 701/51 |
| 5,625,143 A |   4/1997 | Kadota | 73/116 |
| 5,638,788 A | *  6/1997 | Sanvido et al. | 123/339.2 |
| 5,663,879 A | *  9/1997 | Trovato et al. | 701/2 |
| 5,689,066 A |  11/1997 | Stevenson | 731/18.1 |
| 5,726,891 A |   3/1998 | Sisson et al. | 701/100 |
| 5,734,595 A | *  3/1998 | Matsuno | 701/104 |
| 5,834,624 A |  11/1998 | Nakagawa | 73/23.32 |
| 5,934,255 A | *  8/1999 | Dalton et al. | 123/478 |
| 6,026,795 A | *  2/2000 | Poggio et al. | 123/695 |
| 6,253,113 B1 | *  6/2001 | Lu | 700/28 |
| 6,381,504 B1 | *  4/2002 | Havener et al. | 700/44 |
| 6,405,122 B1 | *  6/2002 | Yamaguchi | 701/106 |
| 2001/0017227 A1 | *  8/2001 | Amano et al. | 180/65.2 |

FOREIGN PATENT DOCUMENTS

EP    0 858 017 A2    8/1998

* cited by examiner

Primary Examiner—John Follansbee
Assistant Examiner—Crystal J Barnes
(74) Attorney, Agent, or Firm—David L. Narciso; Armstrong Teasdale LLP

(57) ABSTRACT

Methods and systems for reducing or removing the effect of measurement error so that an actual engine operates closer to optimum are described. In an exemplary embodiment, the method includes the steps of identifying an engine operation (e.g., acceleration) that is less than optimal, estimating the measurement error associated with the less than optimal operation, adjusting the engine control logic based on the measurement error estimate, and reassessing the engine operation. The method is implemented, in one form, in an engine controller by programming a control processor to execute the above described method.

12 Claims, 1 Drawing Sheet

METHODS AND SYSTEMS FOR COMPENSATION OF MEASUREMENT ERROR

The Government has rights in this invention pursuant to Contract No. MDA972-98-3-0002 awarded by the Defense Advanced Research Projects Agency.

BACKGROUND OF THE INVENTION

The present invention relates to gas turbine engines, and more specifically, to compensating for measurement error using control logic.

Gas turbine engines include sensor and actuator position feedback used for control and diagnostics. The term sensor, as used herein, refers to engine mounted measurement devices. Values from the sensors are validated and then used implicitly by the control and diagnostic logic. The true values for the pressures, temperatures, actuator positions, speeds, and other engine variables, however, differ from the measured values. The difference between the true value and the measured value is referred to as measurement error.

Measurement errors are generally attributed to transducer inaccuracy, physical differences such as valve characteristics, and gas path profile effects. Measurement error due to transducer inaccuracy primarily results from manufacturing tolerances and signal conditioning errors. Measurement error due to valve characteristics results from geometry variations due to manufacturing tolerances and inaccuracies in valve position to flow relationships.

Measurement errors due to gas path profile effects are a combination of physical tolerances in the sensor and the sensor installation into the engine. The engine installation introduces dimensional variability, such as immersion depth and alignment, which can lead to differing sensing locations within the gas path temperature and pressure profile. Profile measurement error is usually much larger at aft stages of an engine since combustion and gas mixing are significant factors in such measurement error.

An absolute level of measurement error depends on an accuracy specification used in device design, the type of device, and the device utilization. For example, a pressure transducer critical for engine control typically must be much more accurate than a condition monitoring sensor for optional equipment that is not flight critical. Once installed, measurement error often is assumed to be consistent with respect to sign (i.e., positive or negative error). However, error magnitude will vary with operating conditions, e.g., a larger measurement error at high power versus idle.

Since an engine controller uses indicated values from the sensors, the effects of measurement error are accommodated in an overall engine control law design process. Typically, control laws are designed to include margins for a worstcase measurement error. While this approach provides a safe margin of operation for a worst case engine, this approach also results in larger than necessary margins for all other engines.

BRIEF SUMMARY OF THE INVENTION

The present methods and systems, in one aspect, reduce conservatism inherent in selecting a worst-case measurement error by reducing, or removing, the effect of measurement error so that an actual engine operates closer to optimum. In an exemplary embodiment, the method includes the steps of identifying an engine operation (e.g., acceleration) that is less than optimal, estimating the measurement error associated with the less than optimal operation, adjusting the engine control logic based on the measurement error estimate, and reassessing the engine operation. The method is implemented, in one form, in an engine controller by programming a control processor to execute the above described method.

The above described method provides the advantage that measurement error adjustments are made depending upon the characteristics of each engine rather than making a same adjustment for all engines of a particular type or model. In addition, an engine with below nominal operating characteristics can be returned to nominal operation without replacing sensors or other related hardware, which results in increased time on-wing, lower acceleration time, and reduced operating temperatures.

DETAILED DESCRIPTION OF THE INVENTION

Figure 1:
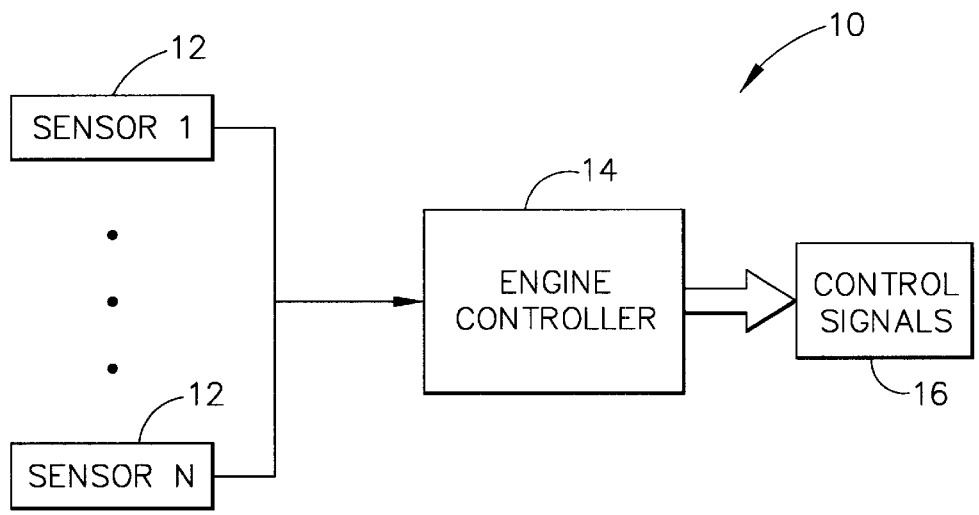
FIG. 1 is a block diagram of an engine control system.

FIG. 1 is a block diagram of an engine control system 10. As shown in FIG. 1, multiple sensors (Sensor 1–Sensor N) 12 are coupled to an engine controller 14. Controller 14, in one embodiment, is a processor programmed to execute control logic for generating control signals 16. More specifically, controller 14 generates engine control signals based on the measured values supplied by sensors 12. Sensors 12 include, for example, a fan speed sensor (N1), a fan inlet temperature (T12) sensor, a compressor inlet temperature (T25) sensor, a high pressure compressor discharge pressure (P3) transducer, fuel metering valve (FMV) position sensor, as well as many other sensors. Such sensors are well known in the art.

As explained above, engine controller 14 uses indicated values from sensors 12 to generate control signals. The control laws used by controller 14 in generating such signals typically include margins for a worst-case measurement error. While this approach provides a safe margin of operation for a worst case engine, this approach also results in larger than necessary margins for all other engines.

Generally, the present methods and systems are directed towards reducing the conservatism inherent in selecting a worst-case measurement error by reducing or removing the effect of measurement error so that the actual engine operates closer to optimum. The method includes the steps of identifying an engine operation that is less than optimal, estimating the measurement error associated with the less than optimal operation, adjusting the engine control logic based on the measurement error estimate, and reassessing the engine operation. The method is implemented, in one form, in controller 14. Specifically, in the one embodiment, the processor in controller 14 is programmed to execute the above described processing.

More specifically, since the measurement error manifests itself in engine operational effects, these operational effects are utilized in the measurement error estimation. For example, time to accelerate an engine is a function of the transient regulator. The measurement error effects of the sensors utilized in the transient regulator logic impacts the actual acceleration time. If an actual acceleration response is measured and compared to a nominal (no error) response, then an estimate of the overall measurement error on the transient regulator can be made, i.e., measured value minus nominal value. After generating a measurement error estimate, then the appropriate sensor can be made "error free" by making a compensation adjustment in the engine control logic.

Figure 2:
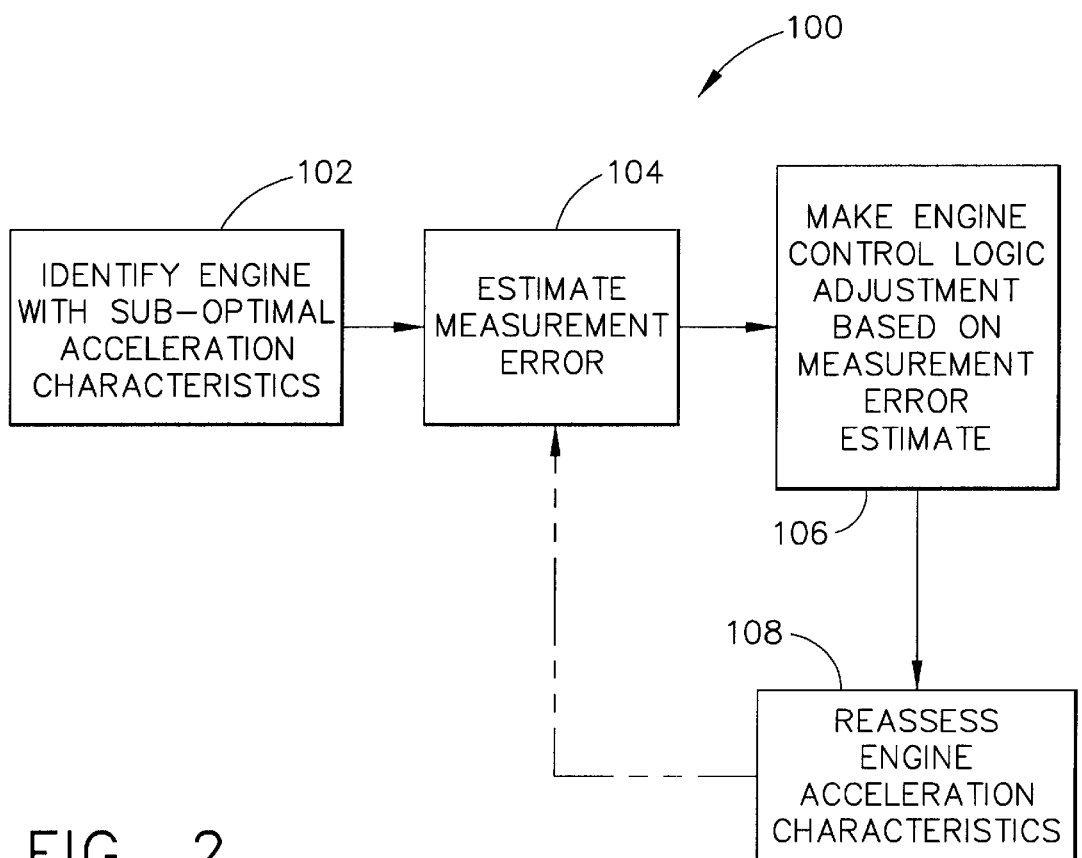
FIG. 2 is a process flow diagram for performing measurement error estimation adjustment in the engine control system shown in FIG. 1.

FIG. 2 illustrates a process 100 for compensating for measurement error in the engine control logic if less than optimal acceleration operation is detected. Referring specifically to FIG. 2, controller 14 is programmed to determine whether the engine is exhibiting slow acceleration characteristics by comparing the measured acceleration characteristics from sensors 12 to nominal values, e.g., pre-stored in a memory of controller 14. If the difference between the measured and nominal values exceeds a predetermined threshold value, then the engine characteristics are considered sub-optimal 102 and controller then proceeds with estimating the overall transient regulator measurement error 104.

To estimate the overall measurement error, a large number of simulated engines with random or specified measurement error are defined. Simulated transients are run over a specified operating regime (altitude, ambient temperature, bleed settings, etc.) for different engine quality and deterioration levels. A multivariate regression fit is used to estimate the measurement error as a function of sensor data and operational data, such as regulator usage (i.e., which regulator is in control and for how long). The regression fit is obtained by one of the techniques well known to those skilled in the art, such as linear regression, response surface fits using polynomials or neural networks. In one specific embodiment, instead of estimating each measurement error individually, an equivalent fuel metering valve (FMV) bias or measurement error is estimated using the regression fit.

After generating a measurement error estimate, the appropriate sensor value used in controller 14 is made "error free" by making a compensation adjustment in the engine control logic 106. Specifically, the measured value is adjusted by a percentage (0–100%) of the estimated measurement error. The percentage selected can be equal to 100%, or to a lower value, such as 75%, to allow for inaccuracies in esitmating the measurement error, and can be pre-stored as an adjustable constant in the controller memory. The adjusted sensor value is then used by controller 14 in further processing and in generating control signals.

Once the adjustment is made, the engine acceleration characteristics are reassessed 108. If the engine still exhibits sub-optimal acceleration characteristics additional measurement error adjustments are made by returning to step 102 and then proceeding with processing.

The above described methods and systems provide the advantage that measurement error adjustments are made depending upon the characteristics of each engine with its specific sensor set and physical device (valves, etc.) characteristics rather than making a same adjustment for all engines of a particular type or model. In addition, an engine with below nominal operating characteristics can be returned to nominal operation without replacing sensors or other related hardware, which results in increased time on-wing, lower acceleration time, and reduced operating temperatures.

While the invention has been described in terms of various specific embodiments, those skilled in the art will recognize that the invention can be practiced with modification within the spirit and scope of the claims.

What is claimed is:

1. A method for controlling operation of an engine, said method comprising the steps of:

identifying an engine operation that is less than optimal;

estimating a measurement error associated with the less than optimal engine operation; and adjusting engine control logic by subtracting a percentage of the measurement error estimate from a measured sensor value.

2. A method in accordance with claim 1 further comprising the step of reassessing the engine operation after adjusting the engine control logic.

3. A method in accordance with claim 1 wherein identifying an engine operation that is less than optimal comprises the step of comparing a measured sensor value to a nominal value.

4. A method in accordance with claim 1 wherein estimating measurement error comprises the step using sensor data and operating data.

5. An engine controller comprising a processor programmed to:

identify an engine operation that is less than optimal;

estimate a measurement error associated with the less than optimal engine operation; and subtract a percentage of the measurement error estimate from a measured sensor value such that the engine control logic is adjusted based the measurement error estimate.

6. A controller in accordance with claim 5 wherein said processor is further programmed to reassess the engine operation after adjusting the engine control logic.

7. A controller in accordance with claim 5 wherein to identify an engine operation that is less than optimal, said processor is programmed to compare a measured sensor value to a nominal value.

8. A controller in accordance with claim 5 wherein to estimate measurement error said processor is programmed to use sensor data and operating data.

9. A method for controlling acceleration of an engine, said method comprising the steps of:

determining whether the engine acceleration is less that optimal;

if the engine acceleration is less that optimal, then:
estimating a measurement error; and
adjusting engine control logic by subtracting a percentage of the measurement error estimate from a measured sensor value.

10. A method in accordance with claim 9 further comprising the step of reassessing engine acceleration characteristics after adjusting the engine control logic.

11. A method in accordance with claim 9 wherein identifying if engine acceleration is less than optimal comprises the step of comparing a measured sensor value to a nominal value.

12. A method in accordance with claim 9 wherein estimating measurement error comprises the step of using sensor data and transient regulator usage inputs to a regression equation.

* * * * *

UNITED STATES PATENT AND TRADEMARK OFFICE
CERTIFICATE OF CORRECTION

PATENT NO.    : 6,564,109 B1
DATED         : May 13, 2003
INVENTOR(S)   : Ashby et al.

It is certified that error appears in the above-identified patent and that said Letters Patent is hereby corrected as shown below:

<u>Column 4,</u>
Lines 45 and 47, delete "less that" and insert therefor -- less than --.

Signed and Sealed this

Sixth Day of September, 2005

JON W. DUDAS
*Director of the United States Patent and Trademark Office*